US012337631B2

(12) United States Patent
Tanaka (10) Patent No.: US 12,337,631 B2
(45) Date of Patent: Jun. 24, 2025

(54) TOWING DETERMINATION DEVICE (71) Applicant: TOYOTA JIDOSHA KABUSHIKI KAISHA, Toyota (JP)

(72) Inventor: Takanori Tanaka, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 125 days.

(21) Appl. No.: 18/481,502

(22) Filed: Oct. 5, 2023

(65) Prior Publication Data

US 2024/0246378 A1 Jul. 25, 2024

(30) Foreign Application Priority Data

Jan. 20, 2023 (JP) ................. 2023-007195

(51) Int. Cl.
G08B 21/00 (2006.01)
B60D 1/62 (2006.01)

(52) U.S. Cl.
CPC ..................... B60D 1/62 (2013.01)

(58) Field of Classification Search
CPC ...... B60D 1/62; B60W 40/02; B60W 2554/80
USPC ......................................... 340/431
See application file for complete search history.

(56) References Cited

U.S. PATENT DOCUMENTS

2006/0217887 A1   9/2006  Iwasaka
2014/0176716 A1*  6/2014  Wallat ............... B60W 30/12
                                                348/148
2021/0245662 A1*  8/2021  Blank ................ B60R 11/0235

FOREIGN PATENT DOCUMENTS

JP   2006-185376 A   7/2006
JP   2017-211696 A  11/2017
JP   2019-026209 A   2/2019
JP   2019-123299 A   7/2019

* cited by examiner

Primary Examiner — Tai T Nguyen
(74) Attorney, Agent, or Firm — SoraIP, Inc.

(57) ABSTRACT

The towing determination device includes a rear sensor and a processor configured to determine whether or not the host vehicle is towing an object based on information obtained from the rear sensor. The processor detects an object OB following the own vehicle while maintaining a constant distance from the own vehicle without deviating from the trajectory TR of the own vehicle while the own vehicle is turning. If so, it is determined that the vehicle is towing the object OB. The processor detects an object OB following the own vehicle while maintaining a constant distance from the own vehicle while deviating from the trajectory TR of the own vehicle while the own vehicle is turning. If so, it is determined that the vehicle is not towing the object OB.

5 Claims, 5 Drawing Sheets

TOWING DETERMINATION DEVICE

CROSS-REFERENCE TO RELATED APPLICATION

This application claims priority to Japanese Patent Application No. 2023-007195 filed on Jan. 20, 2023, incorporated herein by reference in its entirety.

BACKGROUND

1. Technical Field

The present disclosure relates to a towing determination device that determines whether an own vehicle is towing an object (another vehicle).

2. Description of Related Art

A device for determining whether an own vehicle is towing an object has been proposed (see, for example, Japanese Unexamined Patent Application Publication No. 2017-211696 (JP 2017-211696 A)). The device disclosed in JP 2017-211696 A (hereinafter referred to as a "conventional device") includes a rear sensor and a processor. The rear sensor includes a transmission unit that emits radio waves to an area rearward of the own vehicle and a reception unit that receives the reflected waves of the radio waves. The rear sensor acquires (recognizes) the distribution of reflection points based on the received reflected waves, and based on the result, detects the distance between an object located behind the own vehicle and the own vehicle, and the direction of the object relative to the own vehicle, etc. Based on the information acquired from the rear sensor, the processor determines, when an object following the own vehicle by maintaining a certain distance from the own vehicle behind the own vehicle is detected based on the information acquired from the rear sensor, that the own vehicle is towing the object.

SUMMARY

Radio waves emitted from the rear sensor are reflected by objects (road surfaces, guardrails, other vehicles, etc.) located around the own vehicle. By the way, the rear sensor may recognize, even though there is no reflection point of the radio waves actually in a space immediately behind the own vehicle (space occupied by the object when the own vehicle is towing the object), that the reflection point is present. In other words, the rear sensor may recognize that the object is present even though the object is not present immediately behind the own vehicle. The distribution of the reflection point that is not present (object that is not present) is generally referred to as a "ghost". When various conditions including road surface conditions (e.g. conditions related to the depth of unevenness on the road surface), guardrails, conditions related to the positional relationship between other vehicles and the own vehicle overlap and are met (e.g. when the reflected radio waves interfere with each other at multiple reflection points), a ghost occurs. The conventional device does not include a unit for determining the ghost and the object that is present. Therefore, the conventional device may determine that the object is being towed by the own vehicle even though the object is not being towed by the own vehicle.

One of the objects of the present disclosure is to provide a towing determination device that improves the determination accuracy (accuracy) of whether the own vehicle is towing the object.

In order to achieve the above object, a towing determination device (1) according to the present disclosure includes:
- a rear sensor (21) that emits an electromagnetic wave or a sound wave to an area rearward of an own vehicle (V) and acquires information about an object that is present behind the own vehicle based on distribution of a reflection point of the electromagnetic wave or the sound wave; and
- a processor (10) configured to determine whether the own vehicle is towing the object based on the information acquired from the rear sensor.

When an object (OB) following the own vehicle by maintaining a certain distance from the own vehicle without deviating from a trajectory (TR) of the own vehicle is detected based on the information acquired from the rear sensor in a situation in which the own vehicle is turning, the processor is configured to determine that the own vehicle is towing the object. When an object following the own vehicle by maintaining a certain distance from the own vehicle while deviating from a trajectory of the own vehicle is detected based on the information acquired from the rear sensor in a situation in which the own vehicle is turning, the processor is configured to determine that the own vehicle is not towing the object.

In many cases, the relative position between the own vehicle and the ghost when the own vehicle is traveling straight is substantially the same as the relative position between the own vehicle and the ghost when the own vehicle is turning. Therefore, the towing determination device according to the present disclosure determines whether the object detected by the rear sensor is following the trajectory of the own vehicle without deviating from the trajectory thereof, and based on the result, determines whether a towed object is present. Therefore, compared with a conventional device (device that determines whether an object is following the own vehicle and determines whether a towed object is present based only on the determination result), the determination accuracy (accuracy) of determining whether the towed object is present with the towing determination device according to the present disclosure is high.

The towing determination device according to an aspect of the present disclosure includes a steering angle sensor (23) for acquiring a steering angle (θ) of the own vehicle, in which the processor recognizes an area through which the own vehicle has passed as the trajectory based on information acquired from the steering angle sensor.

According to this, the processor can relatively easily recognize the trajectory of the own vehicle.

The towing determination device according to another aspect of the present disclosure includes a front sensor (24) for acquiring information about a target that is present in front of the own vehicle, in which the processor recognizes a traveling lane (L) along which the own vehicle has traveled as the trajectory based on information acquired from the front sensor.

According to this, the processor can relatively easily recognize the trajectory of the own vehicle.

Further, a towing determination method and a storage medium according to the present disclosure include steps executed by various devices included in the towing determination device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Outline

A towing determination device 1 according to one embodiment of the present disclosure is applied to an own vehicle (vehicle V). The towing determination device 1 has a function (towing determination function) that determines whether or not the own vehicle is towing an object (another vehicle). This towing determination result is provided to other devices of the host vehicle. For example, the towing determination result is provided to a notification device that notifies the driver that another vehicle is approaching from behind the own vehicle. When the own vehicle is towing an object, the notification device excludes the object from the notification targets. In addition, the own vehicle may be provided with an automatic driving function.

Specific Configuration

Figure 1:
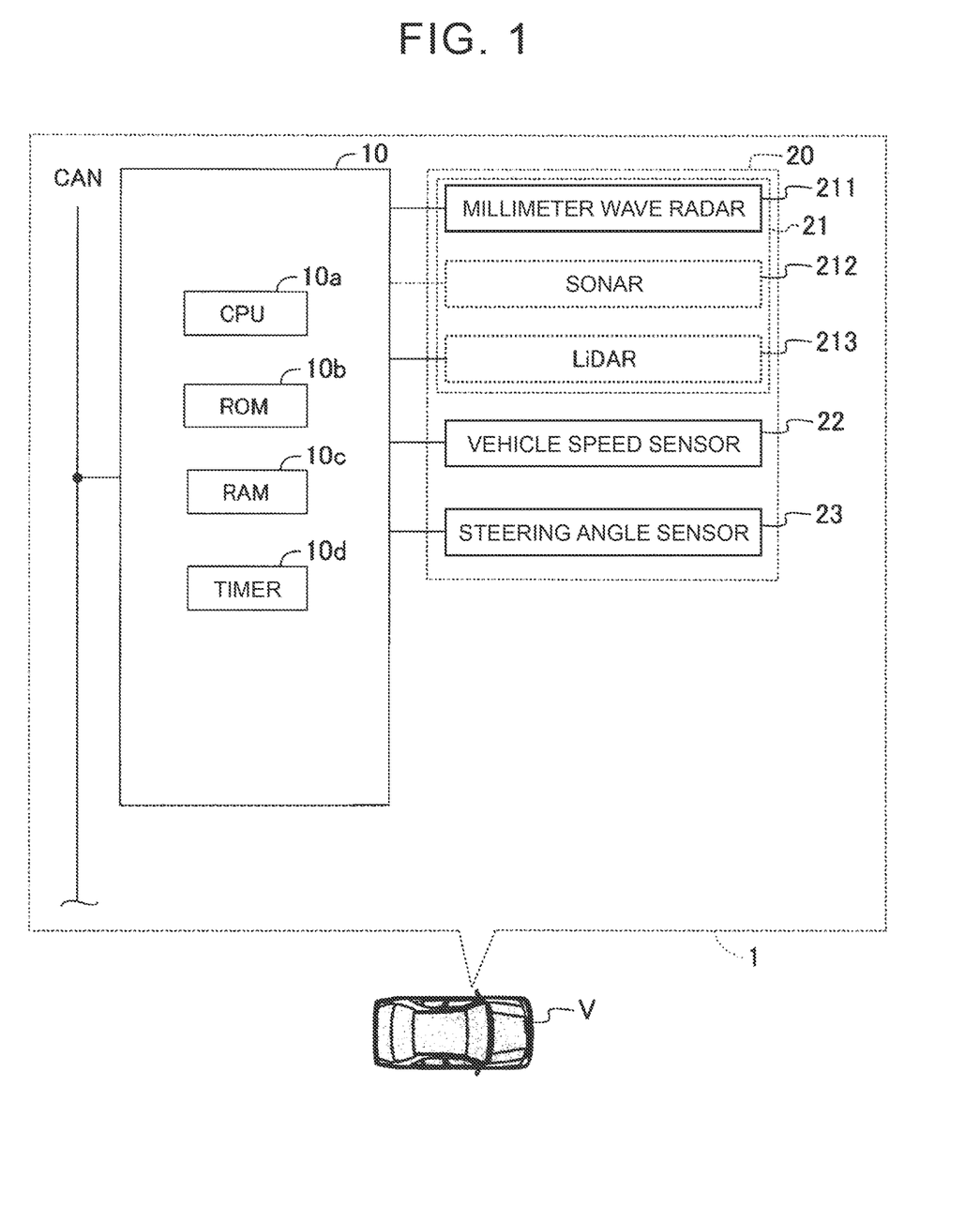
FIG. 1 is a block diagram of a towing determination device according to one embodiment of the present disclosure.

As shown in FIG. 1, the towing determination device 1 includes a towing determination ECU 10 and an in-vehicle sensor 20.

The towing determination ECU 10 includes a CPU 10a, a ROM 10b, a RAM 10c, a timer 10d, and the like. The towing determination ECU 10 is connected to other ECUs (for example, the ECU of the notification device described above) via CAN.

The in-vehicle sensor 20 includes a rear sensor 21 that acquires information on objects existing behind (immediately behind and obliquely behind) the own vehicle. As the rear sensor 21, for example, a millimeter wave radar 211 can be employed.

The millimeter wave radar 211 includes a transmitter/receiver and a signal processor. The transmitting/receiving unit emits radio waves in the millimeter wave band (hereinafter referred to as "millimeter waves") to the rear of the vehicle, and receives the millimeter waves (reflected waves) reflected by objects located within the radiation range. Based on the time from when the transmitter/receiver radiates a millimeter wave until it receives the reflected wave, the phase difference between the transmitted millimeter wave and the received reflected wave, and the degree of attenuation of the reflected wave, the signal processing unit calculates (recognizes) the distribution of reflection points of the millimeter wave. Based on the distribution of the reflection points, the signal processing unit recognizes (identifies) each object located behind the own vehicle. Also, the signal processing unit recognizes the distance between the vehicle and each object, the position (direction) of each object with respect to the vehicle, and the like. The signal processing unit transmits the above recognition result to the towing determination ECU 10.

The object recognized by the millimeter wave radar 211 may exist, but the object may not exist. That is, the object may be a ghost GST. The millimeter-wave radar 211 does not have a function of determining whether a recognized object actually exists based on a group of reflection points.

In-vehicle sensor 20 further includes a vehicle speed sensor 22. The vehicle speed sensor 22 includes a wheel speed sensor that generates one pulse signal (wheel pulse signal) each time the wheels of the host vehicle rotate by a predetermined angle. The vehicle speed sensor 22 measures the number of pulses per unit time of the wheel pulse signal transmitted from the wheel speed sensor, calculates the rotational speed of each wheel (wheel speed) based on the measured number of pulses, and calculates the speed of each wheel. The speed of the own vehicle (actual vehicle speed) vs is calculated based on the wheel speed. The vehicle speed sensor 22 transmits the calculation result to the towing determination ECU 10.

In-vehicle sensor 20 further includes steering angle sensor 23. The steering angle sensor 23 detects the steering angle θ of the steered wheels of the host vehicle. The steering angle sensor 23 transmits the steering angle θ to the towing determination ECU 10.

Actuation

Traction Judgment Function

The towing determination ECU 10 sequentially acquires various types of information from the in-vehicle sensor 20, and determines whether or not the host vehicle is towing an object OB (towed object T) based on this information.

Figure 2A:
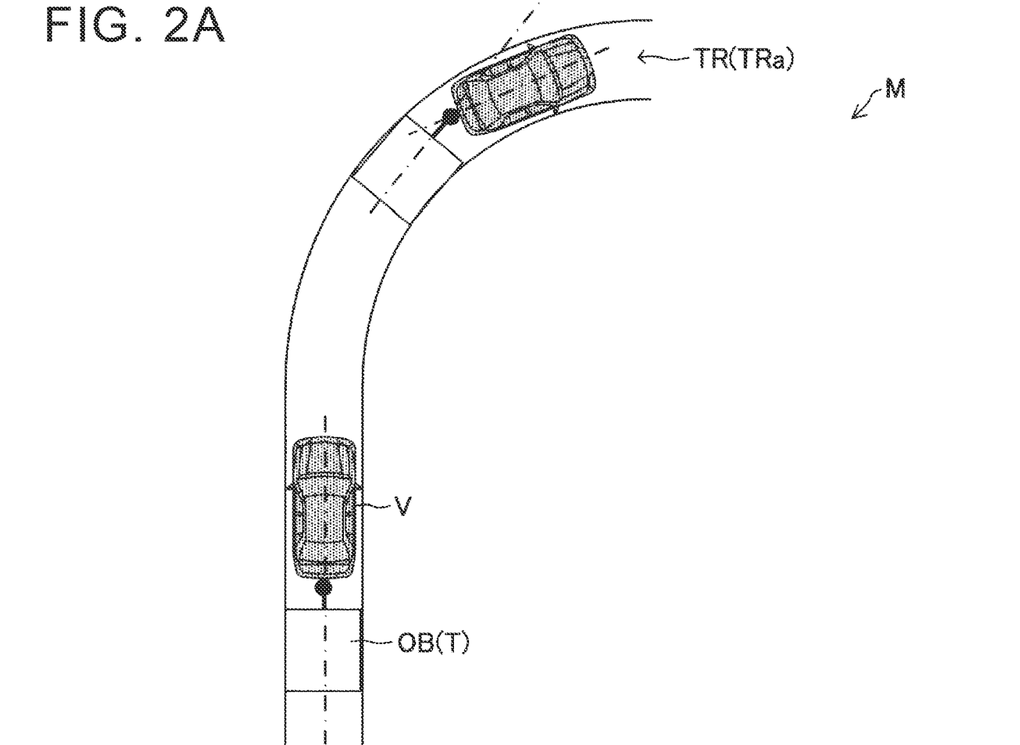
FIG. 2A is a plan view showing the positional relationship between the own vehicle and the towed object.

Here, generally, the towed object T is connected to the own vehicle so as to be able to turn relative to the rear end of the own vehicle. As shown in FIG. 2A, when the vehicle is traveling straight, the center axis of the vehicle (one-dot chain line in the figure) and the center axis of the towed object T (one-dot chain line in the figure) are positioned on the same straight line. On the other hand, when the own vehicle is turning, the central axis of the towed object T intersects the central axis of the own vehicle. In this way, in a situation where the own vehicle is turning, the object OB towed by the own vehicle (existing towed object T) maintains a constant distance from the own vehicle. It follows the own vehicle without deviating from the trajectory TR.

Figure 2B:
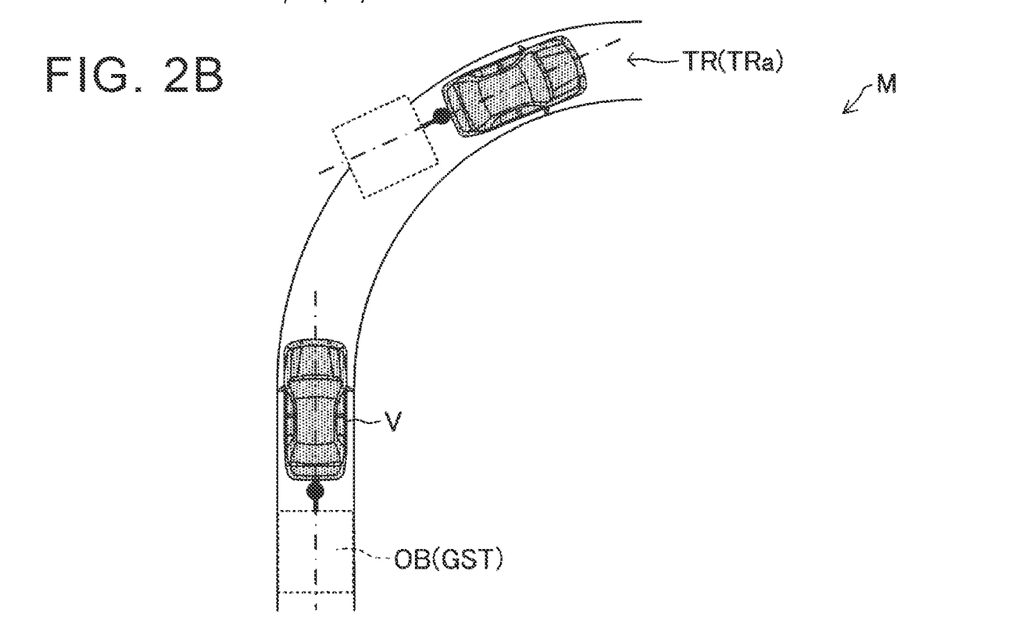
FIG. 2B is a plan view showing the positional relationship between the own vehicle and the ghost.

On the other hand, as shown in FIG. 2B, the position of the ghost GST (non-existent object OB) with respect to the own vehicle when the own vehicle is traveling straight ahead, and in many cases, the position of the ghost GST is substantially the same. Therefore, in a situation where the own vehicle is turning, the ghost GST follows the own vehicle while maintaining a certain distance from the own vehicle, but a part of the ghost GST often deviates from the trajectory TR of the own vehicle.

Therefore, as described below, the towing determination ECU 10 determines whether an object is an object OB detected by the millimeter wave radar 211 and the object OB located immediately behind the own vehicle actually exists (whether the object OB is a towed object T or a ghost GST).

Specifically, the towing determination ECU 10 acquires the speed vs and the steering angle θ from the vehicle speed sensor 22 and the steering angle sensor 23 at predetermined intervals. Then, the towing determination ECU 10 obtains (calculates) the trajectory TR of the own vehicle (map M (plan view) showing the area TRa through which the own vehicle has passed) based on the time-series data of the speed vs and the steering angle θ.

Also, the towing determination ECU 10 determines whether or not the host vehicle is turning based on the steering angle θ acquired from the steering angle sensor 23. The towing determination ECU 10 determines that the host vehicle is turning when the steering angle θ exceeds the threshold value θth.

In addition, the towing determination ECU 10 sequentially acquires information (the position of each object relative to the vehicle) from the millimeter wave radar 211 while the vehicle is turning. Based on the information obtained from the millimeter wave radar 211, the towing determination ECU 10 identifies the object OB positioned immediately behind the vehicle, and further identifies the front end surface of the object OB (the portion facing the rear end surface of the vehicle). In addition, from the millimeter wave radar 211, the towing determination ECU 10 detects the center of the front end of the object OB (the portion facing the rear end surface of the vehicle) in the width direction and the rear end of the vehicle in the width direction. The distance Δd from the central portion is obtained successively.

Also, the towing determination ECU 10 sequentially determines whether or not the object OB deviates from the trajectory TR (area TRa) based on the information acquired from the millimeter wave radar 211. Specifically, when the towing determination ECU 10 detects that one end in the width direction of the front end surface of the object OB is located outside the trajectory TR in the map M, the towing determination ECU 10 detects that the object OB deviates from the trajectory TR. On the other hand, when the towing determination ECU 10 detects that both ends of the front end surface of the object OB in the width direction are positioned inside the trajectory TR in plan view, the towing determination ECU 10 determines that the object OB does not deviate from the trajectory TR.

The towing determination ECU 10 determines that the distance Δd is constant (a state in which the object OB is being followed while maintaining a constant distance from the own vehicle) when the own vehicle is turning, and that the object OB is on the trajectory TR. If the time Δta during which the state of deviation from TR continues exceeds the threshold Δtath, it is determined that the object OB does not exist (it is a ghost GST). That is, in this case, the towing determination ECU 10 determines that the host vehicle is not towing the object OB. On the other hand, the towing determination ECU 10 maintains that the distance Δd is constant (the difference between the maximum value and the minimum value is small) and the object OB does not deviate from the trajectory TR when the host vehicle is turning. If the time Δtb during which the object OB is present exceeds the threshold Δtbth, it is determined that the object OB actually exists. That is, in this case, the towing determination ECU 10 determines that the host vehicle is towing the object OB. Note that the threshold Δtath and the threshold Δtbth may be the same or different.

When the towing determination ECU 10 determines whether or not the vehicle is towing the object OB (whether or not there is a towed object T), the towing determination ECU 10 transmits the determination result to another ECU (for example, the ECU of the notification device). It should be noted that once the towing determination ECU 10 determines whether or not the towed object T exists after the ignition switch of the host vehicle transitions from the off state to the on state, the towing determination ECU 10 does not determine the existence of the towed object T until the ignition switch transitions to the off state.

Figure 3:
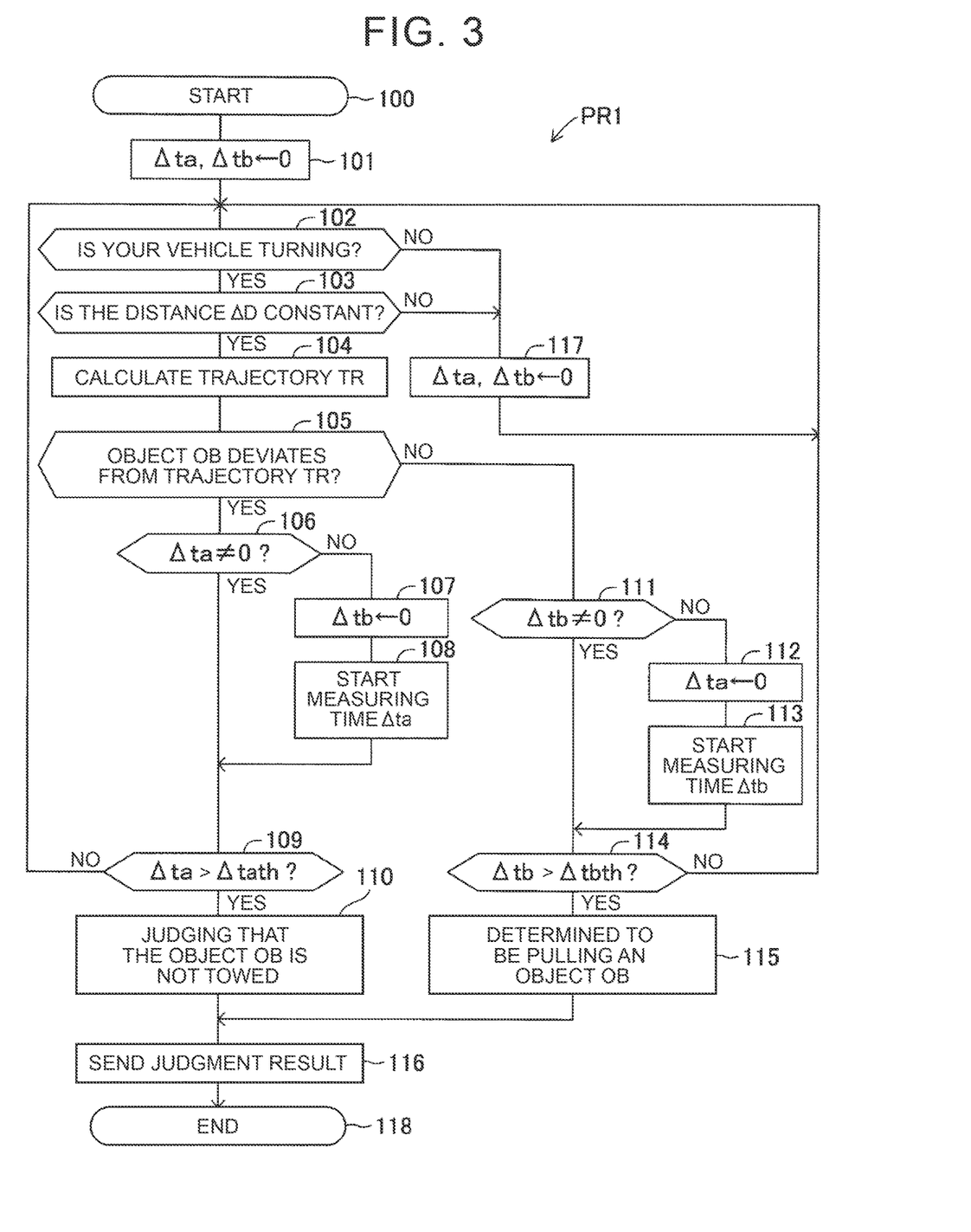
FIG. 3 is a flowchart of a program for realizing the towing determination function.

Next, referring to FIG. 3, a program PR1 executed by the CPU 10a (hereinafter referred to as "CPU") of the towing determination ECU 10 for executing the towing determination function will be described. The program PR1 is stored in a storage medium.

When the CPU detects that the ignition switch of the host vehicle has changed from the off state to the on state, it starts executing the program PR1.

After starting execution of the program PR1 from step 100, the CPU proceeds to step 101.

When the CPU proceeds to step 101, the CPU executes initialization processing. Specifically, the CPU sets the time Δta and the time Δtb as the output (time measurement result) of the timer 10d to "0". Then, the CPU proceeds to step 102.

When proceeding to step 102, the CPU determines whether or not the host vehicle is turning. The CPU determines that the host vehicle is turning when the steering angle θ exceeds the threshold θth. On the other hand, when the steering angle θ is equal to or less than the threshold θth, the CPU determines that the host vehicle is not turning. When the CPU determines that the host vehicle is turning (102: Yes), the process proceeds to step 103. On the other hand, when the CPU determines that the host vehicle is not turning (102: No), the process proceeds to step 117, which will be described later.

When the CPU proceeds to step 103, the CPU obtains information about each object from the millimeter wave radar 211, and based on the information, identifies the object OB positioned immediately behind the host vehicle. Then, the CPU determines whether the distance Δd between the host vehicle and the object OB is constant. Specifically, the CPU acquires the distance Δd from the millimeter wave radar 211 at a predetermined cycle, and stores the distance Δd in the RAM 10c as time-series data. When the difference between the maximum value and the minimum value in the time-series data of the distance Δd in the period from when the host vehicle started turning to the present time is minute (below the threshold value), the CPU determines that the distance Δd is constant. When the CPU determines that the distance Δd is constant, the process proceeds to step 104. On the other hand, when the CPU determines that the distance Δd is not constant (103: No), it proceeds to step 117, which will be described later.

When the CPU proceeds to step 104, the trajectory TR is calculated. Specifically, the CPU acquires the steering angle θ and the speed vs from the in-vehicle sensor 20 at a predetermined cycle, and stores this information as time-series data in the RAM 10c. Based on these time-series data, the CPU calculates (updates) a map M indicating an area TRa (trajectory TR) through which the vehicle has passed. Then, go to step 105.

When proceeding to step 105, the CPU calculates the position of the object OB on the map M, and based on the result, determines whether or not the object OB deviates from the trajectory TR. When the CPU determines that part of the object OB has deviated from the trajectory TR (105: Yes), the process proceeds to step 106. On the other hand, when the CPU determines that the object OB has not deviated from the trajectory TR (105: No), the process proceeds to step 111, which will be described later.

When the CPU proceeds to step 106, the CPU determines whether the time Δta is being measured. When the time Δta is not "0", the CPU determines that the time Δta is being measured. On the other hand, when the time Δta is "0", the CPU determines that the time Δta has not been measured. When the CPU determines that the time Δta is being measured (106: Yes), the process proceeds to step 109. On the other hand, when the CPU determines that the time Δta has not been measured (106: No), the process proceeds to step 107.

When the CPU proceeds to step 107, it sets the time Δtb to "0". That is, when the timer 10d is measuring the time Δtb, the measurement is terminated. Then, the CPU proceeds to step 108. If the timer 10d has not measured the time Δtb, the CPU directly proceeds to step 108.

When proceeding to step 108, the CPU causes the timer 10d to start measuring the time Δta. Then, the CPU proceeds to step 109.

When proceeding to step 109, the CPU determines whether or not the time Δta exceeds the threshold Δtath. If the time Δta exceeds the threshold Δtath (109: Yes), the CPU proceeds to step 110. On the other hand, if the time Δta is equal to or less than the threshold Δtath (109: No), the CPU returns to step 102.

When proceeding to step 110, the CPU determines that "the own vehicle is not towing the object OB". Then, the CPU proceeds to step 116, which will be described later.

When proceeding from step 105 to step 111, the CPU determines whether the time Δtb is being measured. When the time Δtb is not "0", the CPU determines that the time Δtb is being measured. On the other hand, when the time Δtb is "0", the CPU determines that the time Δtb has not been measured. When the CPU determines that the time Δtb is being measured (111: Yes), the process proceeds to step 114. On the other hand, when the CPU determines that the time Δtb has not been measured (111: No), the process proceeds to step 112.

When the CPU proceeds to step 112, it sets the time Δta to "0". That is, when the timer 10d is measuring the time Δta, the measurement is terminated. Then, the CPU proceeds to step 113. If the timer 10d has not measured the time Δta, the CPU directly proceeds to step 113.

When proceeding to step 113, the CPU causes the timer 10d to start measuring the time Δtb. Then, the CPU proceeds to step 114.

When the CPU proceeds to step 114, the CPU determines whether or not the time Δtb exceeds the threshold Δtbth. If the time Δtb exceeds the threshold Δtbth (114: Yes), the CPU proceeds to step 115. On the other hand, when the time Δtb is equal to or less than the threshold Δtbth (114: No), the CPU returns to step 102.

When proceeding to step 115, the CPU determines that "the own vehicle is towing the object OB". Then, the CPU proceeds to step 116.

After proceeding from step 110 or step 115 to step 116, the CPU transmits the determination result of the presence or absence of the towed object T to another ECU (for example, the ECU of the notification device). Then, the CPU proceeds to step 118 and terminates execution of the program PR1.

Note that when the CPU proceeds to step 117 from step 102 or step 103, it resets the timer 10d (time Δta, Δtb) and returns to step 102.

Effect

As described above, the relative position between the host vehicle and the ghost when the host vehicle is traveling straight and the relative position between the host vehicle and the ghost when the host vehicle is turning are often substantially the same. Therefore, the towing determination device 1 determines whether or not the object detected by the rear sensor 21 is following the vehicle without deviating from the trajectory of the vehicle when the vehicle is turning, and based on the result, determines whether or not there is a towed object. Therefore, compared to a conventional device (a device that determines whether or not an object is following the own vehicle and determines whether or not there is a towed object T based only on the determination result), the determination accuracy (accuracy) of the presence or absence of the towed object T by the towing determination device 1 is high.

The present disclosure is not limited to the above embodiment, and various modifications can be adopted within the scope of the present disclosure.

Modification 1

As shown in FIG. 1, sonar 212 may be employed instead of or in addition to millimeter wave radar 211 as rear sensor 21. Sonar 212 includes a transceiver and a signal processor. The transmitting/receiving unit radiates ultrasonic waves to the rear of the vehicle and receives ultrasonic waves (reflected waves) reflected by objects located within the radiation range. Based on the time from when the transmitting/receiving unit emits an ultrasonic wave to when the reflected wave is received, the phase difference between the transmitted ultrasonic wave and the received reflected wave, and the degree of attenuation of the reflected wave, the signal processing unit detects the ultrasonic wave Calculate (recognize) the distribution of reflection points of. Based on the distribution of the reflection points, the signal processing unit recognizes the distance between the vehicle and the object OB, the relative position (direction) of the object OB with respect to the vehicle, and the like, and sends the recognition result to the towing determination ECU 10.

According to this, it is possible to accurately determine whether the object detected by the sonar 212 is a ghost caused by interference of reflected waves of sound waves.

Modification 2

As shown in FIG. 1, instead of or in addition to the millimeter wave radar 211 as the rear sensor 21, a LiDAR 213 may be employed. The LiDAR 213 comprises a transmitter/receiver and a signal processor. A transmitting/receiving unit emits laser light to the rear of the vehicle and receives laser light (reflected light) reflected by an object located within the emission range. Based on the time from when the transmitting/receiving unit emits ultrasonic waves to when the reflected light is received, the phase difference between the transmitted laser light and the received reflected wave, and the degree of attenuation of the reflected light, the signal processing unit determines the laser light Calculate (recognize) the distribution of reflection points of. Based on the distribution of the reflection points, the signal processing unit recognizes the distance between the vehicle and the object OB, the relative position (direction) of the object OB with respect to the vehicle, and the like, and sends the recognition result to the towing determination ECU 10.

According to this, it is possible to accurately determine whether the object detected by the LiDAR 213 is a ghost caused by interference of reflected light.

Modification 3

Figure 4:
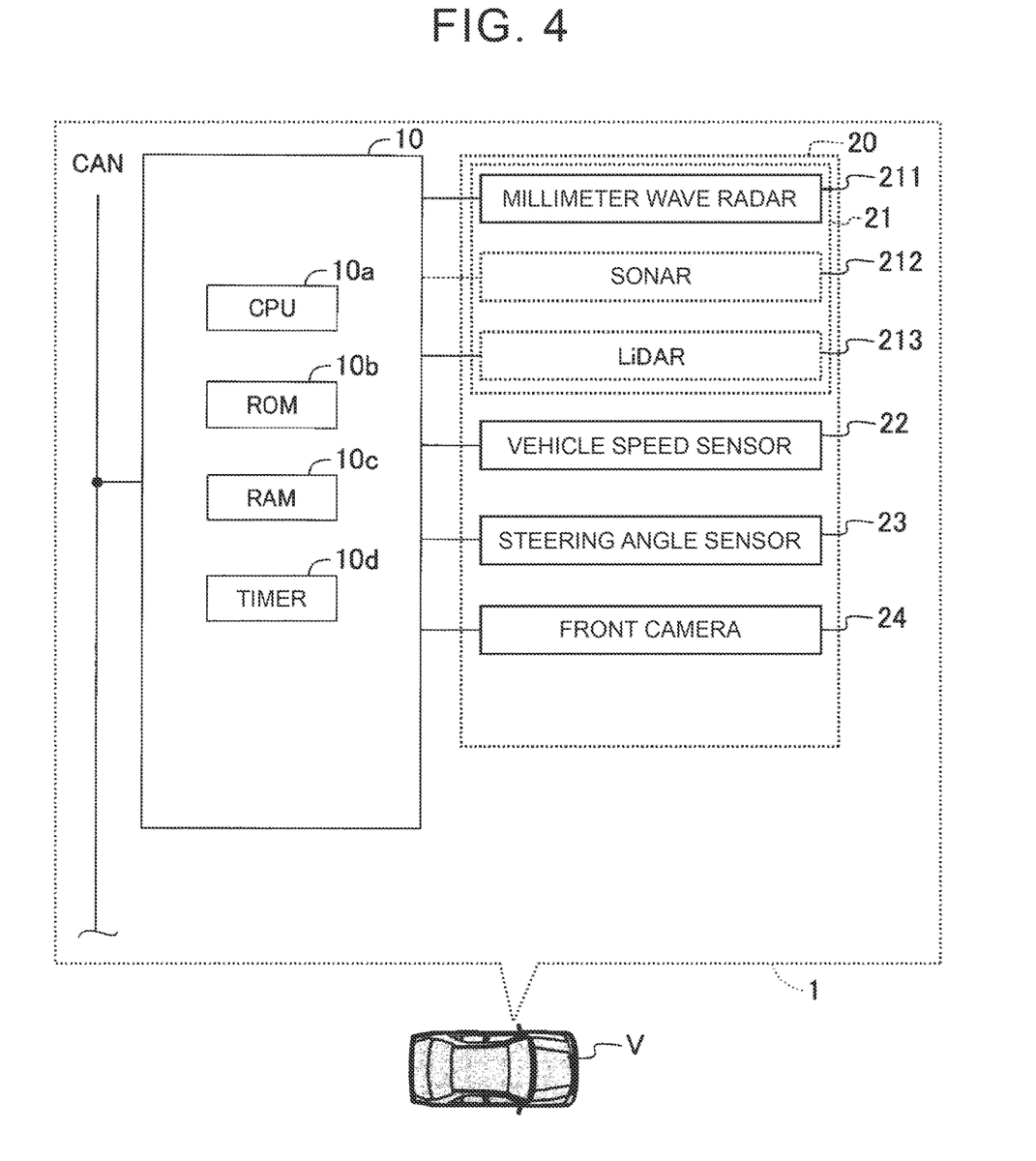
FIG. 4 is a block diagram of a towing determination device according to a modification of the present disclosure.

As shown in FIG. 4, the towing determination device 1 may include a front camera 24 as a front sensor. Front camera 24 includes an imaging device and an image analysis device. The imaging device incorporates, for example, a CCD. The imaging device is installed in the front part of the own vehicle. The imaging device captures an area in front of the own vehicle at a predetermined frame rate to obtain image data. The imaging device transmits image data to the image analysis device. The image analysis device analyzes the acquired image data and recognizes a target in front of the own vehicle from the image. For example, the image analysis device recognizes lane marks (separate lines that divide driving lanes, curbs, dividers, etc.) and transmits the recognition results to the towing determination ECU 10.

Figure 5A:
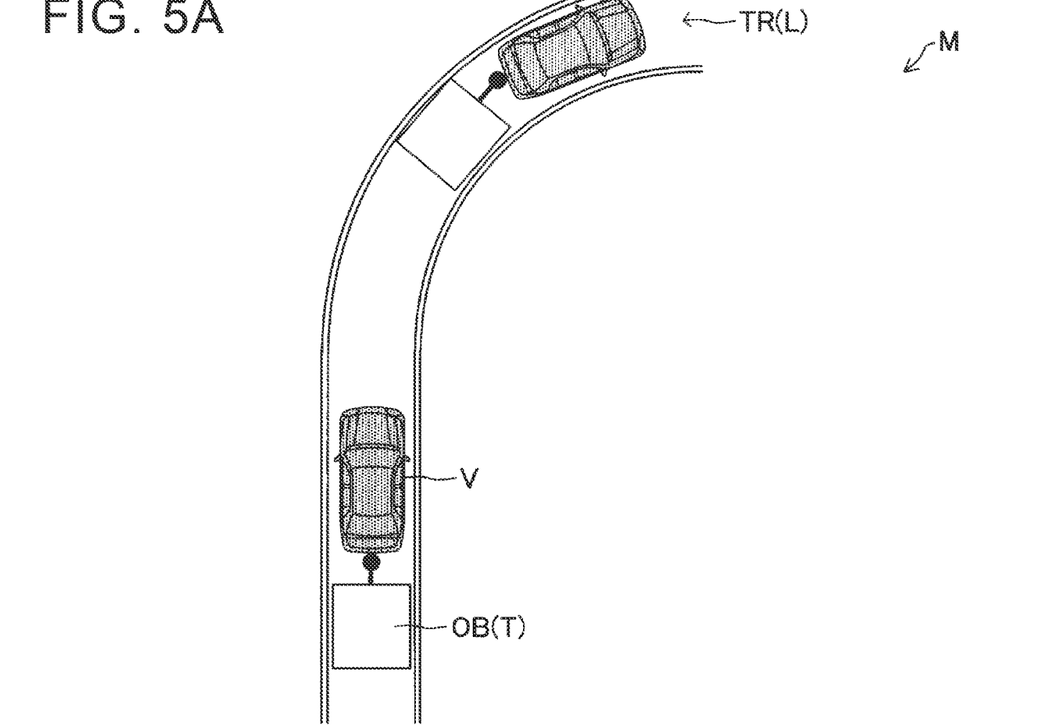
FIG. 5A is a plan view according to a modification of the present disclosure, and is a plan view showing the positional relationship between the own vehicle and the towed object.
Figure 5B:
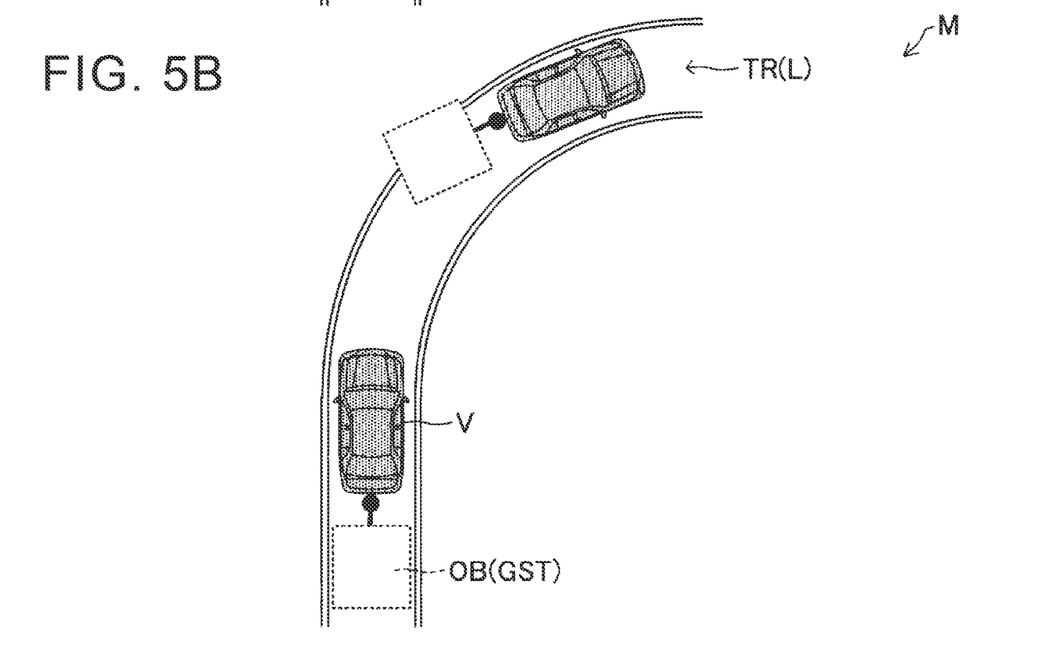
FIG. 5B is a plan view according to a modification of the present disclosure, and is a plan view showing the positional relationship between the own vehicle and the ghost.

Based on the information obtained from the front camera 24 in place of or in addition to the steering angle sensor 23, the towing determination ECU 10 recognizes the lane L in which the vehicle is traveling, as shown in FIGS. 5A and 5B. The towing determination ECU 10 determines that the distance Δd is constant (the difference between the maximum value and the minimum value is very small) and the object OB is deviating from the travel lane L while the host vehicle is turning. If the time Δta for which the object OB is present exceeds the threshold Δtath, it is determined that the object OB does not exist. That is, in this case, the towing determination ECU 10 determines that the host vehicle is not towing the object OB. On the other hand, the towing determination ECU 10 determines that the distance Δd is constant (the difference between the maximum value and the minimum value is very small) and the object OB deviates from the travel lane L when the host vehicle is turning. If the duration Δtb exceeds the threshold Δtbth, it is determined that the object OB actually exists. That is, in this case, the towing determination ECU 10 determines that the host vehicle is towing the object OB.

What is claimed is:

1. A towing determination device comprising:
   a rear sensor that emits an electromagnetic wave or a sound wave to an area rearward of an own vehicle and acquires information about an object that is present behind the own vehicle based on distribution of a reflection point of the electromagnetic wave or the sound wave; and
   a processor configured to determine whether the own vehicle is towing the object based on the information acquired from the rear sensor, wherein:
   when an object following the own vehicle by maintaining a certain distance from the own vehicle without deviating from a trajectory of the own vehicle is detected based on the information acquired from the rear sensor in a situation in which the own vehicle is turning, the processor determines that the own vehicle is towing the object; and
   when an object following the own vehicle by maintaining a certain distance from the own vehicle while deviating from a trajectory of the own vehicle is detected based on the information acquired from the rear sensor in a situation in which the own vehicle is turning, the processor determines that the own vehicle is not towing the object.

2. The towing determination device according to claim 1, further comprising a steering angle sensor for acquiring a steering angle of the own vehicle, wherein the processor recognizes an area through which the own vehicle has passed as the trajectory based on information acquired from the steering angle sensor.

3. The towing determination device according to claim 1, further comprising a front sensor for acquiring information about a target that is present in front of the own vehicle, wherein the processor recognizes a traveling lane along which the own vehicle has traveled as the trajectory based on information acquired from the front sensor.

4. A towing determination method comprising:
   an information acquisition step of emitting an electromagnetic wave or a sound wave to an area rearward of an own vehicle and acquiring information about an object that is present behind the own vehicle based on distribution of a reflection point of the electromagnetic wave or the sound wave; and
   a determination step of determining whether the own vehicle is towing the object based on the information acquired from the information acquisition step, wherein:
   the determination step includes a step configured to determine, when an object following the own vehicle by maintaining a certain distance from the own vehicle without deviating from a trajectory of the own vehicle is detected based on the information acquired from the information acquisition step in a situation in which the own vehicle is turning, that the own vehicle is towing the object; and
   the determination step includes a step configured to determine, when an object following the own vehicle by maintaining a certain distance from the own vehicle while deviating from a trajectory of the own vehicle is detected based on the information acquired from the information acquisition step in a situation in which the own vehicle is turning, that the own vehicle is not towing the object.

5. A non-transitory storage medium storing a towing determination program that causes a computer included in a towing determination device to execute an information acquisition step and a determination step, the information acquisition step being a step of acquiring information about an object that is present behind an own vehicle based on distribution of a reflection point of an electromagnetic wave or a sound wave emitted to an area rearward of the own vehicle, and the determination step being a step of determining whether the own vehicle is towing the object based on the information acquired from the information acquisition step, wherein:
   the determination step includes a step configured to determine, when an object following the own vehicle by maintaining a certain distance from the own vehicle without deviating from a trajectory of the own vehicle is detected based on the information acquired from the information acquisition step in a situation in which the own vehicle is turning, that the own vehicle is towing the object; and
   the determination step includes a step configured to determine, when an object following the own vehicle by maintaining a certain distance from the own vehicle while deviating from a trajectory of the own vehicle is detected based on the information acquired from the information acquisition step in a situation in which the own vehicle is turning, that the own vehicle is not towing the object.

* * * * *